US012023784B2

(12) United States Patent
Janosch et al.

(10) Patent No.: US 12,023,784 B2
(45) Date of Patent: Jul. 2, 2024

(54) CLAMP LOCKING MECHANISM

(71) Applicant: Milwaukee Electric Tool Corporation, Brookfield, WI (US)

(72) Inventors: Daniel R. Janosch, New Berlin, WI (US); Ryan C. Williams, Anderson, SC (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 231 days.

(21) Appl. No.: 17/531,384

(22) Filed: Nov. 19, 2021

(65) Prior Publication Data

US 2022/0152784 A1  May 19, 2022

Related U.S. Application Data

(63) Continuation of application No. PCT/US2021/059462, filed on Nov. 16, 2021.

(Continued)

(51) Int. Cl.
*B25B 1/12* (2006.01)
*B25B 1/10* (2006.01)
(Continued)

(52) U.S. Cl.
CPC ............ *B25B 1/2484* (2013.01); *B25B 1/103* (2013.01); *B25B 1/12* (2013.01); *B25B 1/125* (2013.01);
(Continued)

(58) Field of Classification Search
CPC ....... B25B 1/125; B25B 5/101; B25B 1/2484; B25B 1/103; B25B 5/10; B25B 1/12;
(Continued)

(56) References Cited

U.S. PATENT DOCUMENTS 844,469 A    2/1907  Prouty
3,669,440 A *  6/1972  Kartasuk ................. B25B 1/125
                                                74/89.32
(Continued)

FOREIGN PATENT DOCUMENTS

CN         1042055       2/1999
CN        201881290      6/2011
(Continued)

OTHER PUBLICATIONS

Ink Holder; Document ID JP 3210185 U; Shoho International Trade Co., Ltd. (Year: 2017).*

(Continued)

*Primary Examiner* — Mahdi H Nejad
(74) *Attorney, Agent, or Firm* — Reinhart Boerner Van Deuren s.c.

(57) ABSTRACT

A clamp release mechanism is provided. The clamp includes a body, a shaft slideably coupled to the body, a fixed jaw, and a moveable jaw coupled to the shaft. A locking component actuates between a locked position and an unlocked position. When in the locked position, the locking component biases the shaft to remain stationary with respect to the body. The clamp includes a securing component pivotally coupled to the locking component, and a biasing element that biases the securing components towards the shaft.

20 Claims, 5 Drawing Sheets

Related U.S. Application Data

(60) Provisional application No. 63/115,347, filed on Nov. 18, 2020.

(51) Int. Cl.
| | |
|---|---|
| *B25B 1/22* | (2006.01) |
| *B25B 1/24* | (2006.01) |
| *B25B 1/02* | (2006.01) |
| *B25B 5/10* | (2006.01) |
| *F16H 25/20* | (2006.01) |

(52) U.S. Cl.
CPC .............. *B25B 1/22* (2013.01); *B25B 1/2452* (2013.01); *B25B 1/2457* (2013.01); *B25B 1/2489* (2013.01); *B25B 1/02* (2013.01); *B25B 5/10* (2013.01); *F16H 25/2025* (2013.01); *Y10T 74/1974* (2015.01); *Y10T 74/19805* (2015.01)

(58) Field of Classification Search
CPC ....... B25B 1/22; B25B 1/2452; B25B 1/2457; B25B 1/2489; B25B 1/02; B25B 5/02; B25B 5/166; Y10T 74/1974; Y10T 74/19805; G01C 15/004; F16H 25/2025
USPC ............... 269/181, 182, 249, 246; 74/424.79
See application file for complete search history.

(56) References Cited

U.S. PATENT DOCUMENTS

| | | | |
|---|---|---|---|
| 3,815,434 A * | 6/1974 | Seger | ...................... E04G 25/06 |
| | | | 411/433 |
| 3,894,805 A | 7/1975 | Middleton | |
| 4,023,431 A * | 5/1977 | Pavlas | ................... F16K 31/143 |
| | | | 74/424.94 |
| 5,457,890 A | 10/1995 | Mooty | |
| 5,551,159 A | 9/1996 | Mooty | |
| 5,733,061 A | 3/1998 | Child | |
| 5,970,812 A | 10/1999 | Fan | |
| 6,209,832 B1 | 4/2001 | Yamazaki | |
| 6,256,895 B1 | 7/2001 | Akers | |
| 6,398,175 B1 | 6/2002 | Conner et al. | |
| 6,438,854 B1 | 8/2002 | Kott, Jr. | |
| 6,584,697 B1 | 7/2003 | Guoan et al. | |
| 6,594,910 B2 | 7/2003 | Wishart | |
| 6,598,304 B2 | 7/2003 | Akers | |
| 6,804,893 B2 | 10/2004 | Watson et al. | |
| 7,414,704 B1 | 8/2008 | Nau | |
| 7,441,339 B2 | 10/2008 | Kallabis | |
| 7,441,981 B2 | 10/2008 | Crain et al. | |
| 7,448,138 B1 | 11/2008 | Vanneman | |
| 7,533,712 B2 | 5/2009 | Whittemore et al. | |
| 7,658,219 B2 | 2/2010 | Whittemore | |
| 8,066,051 B2 | 11/2011 | Whittemore | |
| 8,267,365 B2 | 9/2012 | Wiest et al. | |
| 8,371,360 B2 | 2/2013 | Whittemore | |
| 8,511,635 B2 | 8/2013 | Steffen | |
| 8,517,366 B2 * | 8/2013 | Seber | ...................... B25B 1/125 |
| | | | 269/182 |
| 8,668,182 B2 | 3/2014 | Steffen et al. | |
| 8,857,499 B2 | 10/2014 | Whittemore | |
| 9,321,151 B2 | 4/2016 | Yan | |
| 9,441,392 B2 | 9/2016 | Whittemore | |
| 9,441,967 B2 | 9/2016 | Ranieri et al. | |
| 9,513,121 B2 | 12/2016 | Kallabis | |
| 10,689,865 B2 | 6/2020 | Whittemore | |
| 2001/0037579 A1 | 11/2001 | Akers | |
| 2002/0096812 A1 | 7/2002 | Reed | |
| 2007/0145217 A1 | 6/2007 | Kimura | |
| 2010/0131237 A1 | 5/2010 | Pamatmat | |
| 2016/0202056 A1 | 7/2016 | Senger | |
| 2017/0008155 A1 | 1/2017 | Hanlon et al. | |
| 2020/0024858 A1 | 1/2020 | Whittemore | |
| 2021/0247184 A1 | 8/2021 | Michaud | |
| 2022/0395963 A1 * | 12/2022 | Draeger | ................... B25B 5/02 |

FOREIGN PATENT DOCUMENTS

| | | |
|---|---|---|
| CN | 203189430 | 9/2013 |
| CN | 203907518 | 10/2014 |
| CN | 210165154 | 3/2020 |
| CN | 212251808 | 12/2020 |
| CN | 112414378 | 2/2021 |
| DE | 202012009216 | 2/2013 |
| DE | 102013012293 | 2/2014 |
| DE | 102013012294 | 2/2014 |
| DE | 202014100454 | 5/2014 |
| EP | 1939587 | 7/2008 |
| EP | 1939519 | 6/2011 |
| EP | 3361215 | 8/2018 |
| JP | 2016-036891 | 3/2016 |
| JP | 3210185 | 5/2017 |
| JP | 3210185 U * | 5/2017 |
| KR | 10-2016-0127504 | 11/2016 |
| WO | WO08077658 | 7/2008 |
| WO | WO14166854 | 10/2014 |

OTHER PUBLICATIONS

Vice Structure; KR 200164259 Y1; Woo Duck-Jae; (Year: 2000).*
Vise and Workpiece Clamp Method; JP 2016036891 A; Yamamoto Yoshiyuki Horikirigawa Kazuo (Year: 2016).*
Clamping Device With Sliding Function; Document ID: JP H09109037 A; Inventor: Watanabe Koichi, Sato Hidetoshi; Date Filed: Oct. 23, 1995; Date Published: Apr. 28, 1997 (Year: 1997).*
International Search Report and Written Opinion for International Application No. PCT/US2021/059462, dated Mar. 4, 2022, 11 pages.

* cited by examiner

CLAMP LOCKING MECHANISM

CROSS-REFERENCE TO RELATED PATENT APPLICATIONS

The present application is a continuation of International Application No. PCT/US2021/059462, filed Nov. 16, 2021, which claims the benefit of and priority to U.S. Provisional Application No. 63/115,347, filed on Nov. 18, 2020, each which are incorporated herein by reference in their entirety.

BACKGROUND OF THE INVENTION

The present disclosure is directed generally to devices for securing an object to a work piece. The present disclosure relates specifically to a locking mechanism for clamping devices and in particular to clamping devices for holding a laser level.

Clamps are often used to couple a device, such as a laser level, to a work piece, such as a table. Often, the clamps include a mechanism to couple and release the clamp from the work piece.

SUMMARY OF THE INVENTION

One embodiment of the invention relates to a laser level system including a laser level and a clamp. The laser level is configured to emit a laser at a predetermined orientation with respect to gravity. The clamp includes a coupling interface configured to couple to the laser level, a body coupled to the coupling interface, a shaft extending along a first axis, a fixed jaw extending from the body, a movable jaw coupled to an end of the shaft, a locking component configured to interface with the shaft, a securing component pivotally coupled to the locking component, and a biasing element that biases the securing component towards the shaft. The shaft is slidably coupled to the body and configured to slide along the first axis with respect to the body. The movable jaw is configured to slide along the first axis closer to and further from the fixed jaw. The locking component is configured to actuate between a locked position and an unlocked position. When the locking component is in the locked position the locking component interfaces with the shaft to bias the shaft to remain stationary with respect to the body, and when the locking component is in the unlocked position the locking component does not interface with the shaft. The securing component is configured to actuate circumferentially around the shaft.

Another embodiment of the invention relates to a clamp. The clamp includes a body including a recess including a first end and a second end, a shaft extending along a first axis, a coupling interface coupled to the body, a fixed jaw extending from the body, a movable jaw coupled to an end of the shaft, and a locking component configured to interface with the shaft. The shaft is configured to slide along the first axis with respect to the body. The coupling interface includes a platform that extends away from the shaft perpendicular to the first axis, and the platform is configured to couple to a laser level. The movable jaw is configured to slide along the first axis closer to and further from the fixed jaw. The locking component is configured to actuate between a locked position and an unlocked position. When the locking component is in the locked position, the locking component interfaces with the shaft to bias the shaft to remain stationary with respect to the body. When the locking component is in the unlocked position, the locking component does not interface with the shaft. The locking component includes a projection that extends within the recess. When the projection is located at the first end the locking component is in the locked position, and when the projection is located at the second end the locking component is in the unlocked position.

Another embodiment of the invention relates to a clamp. The clamp includes a coupling interface configured to rotatably couple to a laser level such that the laser level rotates with respect to the coupling interface about a first axis, a body coupled to the coupling interface, a shaft extending along a second axis, a fixed jaw coupled to the body, a movable jaw coupled to the shaft, a locking component configured to interface with the shaft, and a securing component pivotally coupled to the locking component. The shaft is slideably coupled to the body and configured to slide along the second axis with respect to the body. The locking component is configured to actuate between a locked position and an unlocked position. When the locking component is in the locked position, the locking component interfaces with the shaft to bias the shaft to remain stationary with respect to the body. The securing component is configured to actuate circumferentially in a first direction when the locking component is transitioning from the locked position to the unlocked position, and the securing component is configured to actuate circumferentially in a second direction opposite the first direction when the locking component is transitioning from the unlocked position to the locked position.

Another embodiment of the invention relates to a clamp including a body, a shaft extending along an axis, the shaft slideably coupled to the body and configured to slide along the axis with respect to the body, a first jaw extending from the body, a movable jaw coupled to an end of the shaft, the movable jaw configured to actuate with respect to the body along the axis closer to and further from the first jaw, a locking component configured to interface with the shaft, a securing component pivotally coupled to the locking component, and a biasing element that biases the securing component towards the shaft. The locking component is configured to actuate between a locked position and an unlocked position. When the locking component is in the locked position, the locking component interfaces with the shaft to bias the shaft to remain stationary with respect to the body. When the locking component is in the unlocked position, the locking component does not interface with the shaft. The securing component is configured to actuate circumferentially around the shaft.

In various embodiments, biasing element includes a magnet. In various embodiments, the shaft includes a threaded outer surface and the locking component includes a threaded inner surface that interfaces with the threaded outer surface of the shaft. In various embodiments, the threaded outer surface of the shaft and the threaded outer surface of the locking component are helical.

In various embodiments, the body includes a recess that receives a projection extending from the locking component. In various embodiments, the recess includes a first end and a second end. When the projection is located at the first end the locking component is in the locked position, and when the projection is located at the second end the locking component is in the unlocked position. In various embodiments, the first end is a first distance from the axis and the second end is a second distance from the axis greater than the first distance. In various embodiments, the recess includes a first portion and a second portion. When the projection is located in the first portion the locking component is in the locked position, and when the projection is located in the second portion the locking component is in the unlocked position.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring generally to the figures, an embodiment of a clamp locking mechanism is shown. Clamps are often used to couple pieces of equipment to work pieces. For example, a clamp may be used to couple a laser level to a table. The present application provides a locking mechanism for a clamp that is easy to lock and unlock, and which operates effectively when the clamp is in any orientation.

The clamp includes a shaft coupled to a moveable jaw. The moveable jaw can be actuated towards and away from a fixed jaw to couple and decouple the clamp from a work piece, such as a table. The clamp includes a locking component that interfaces with the shaft to secure the shaft in position relative to the body of the clamp. The clamp also includes a securing component pivotally coupled to the locking component. A biasing element, such as a magnet, biases the securing component to interface against the shaft. The biasing element maintains the securing component against the shaft so that the clamp locking mechanism works independent of the orientation of the clamp.

The locking component includes a projection that slides along a recess in the body. In use, when the shaft is rotated clockwise, the securing component rotates around the shaft in the clockwise direction, which pulls the locking component in the clockwise direction. As will be explained, clockwise rotation of the locking component actuates the locking component to interface against the shaft. In a specific embodiment, the shaft includes a threaded outer surface and the locking component includes a threaded inner surface so that when the shaft and locking component are interfacing the locking component prevents the shaft from sliding with respect to the body. When the shaft is rotated counter-clockwise, the securing component and locking component also rotate counter-clockwise. Counter-clockwise rotation of the locking component actuates the locking component away from the shaft, thereby allowing the shaft to slide with respect to the body.

Figure 1:
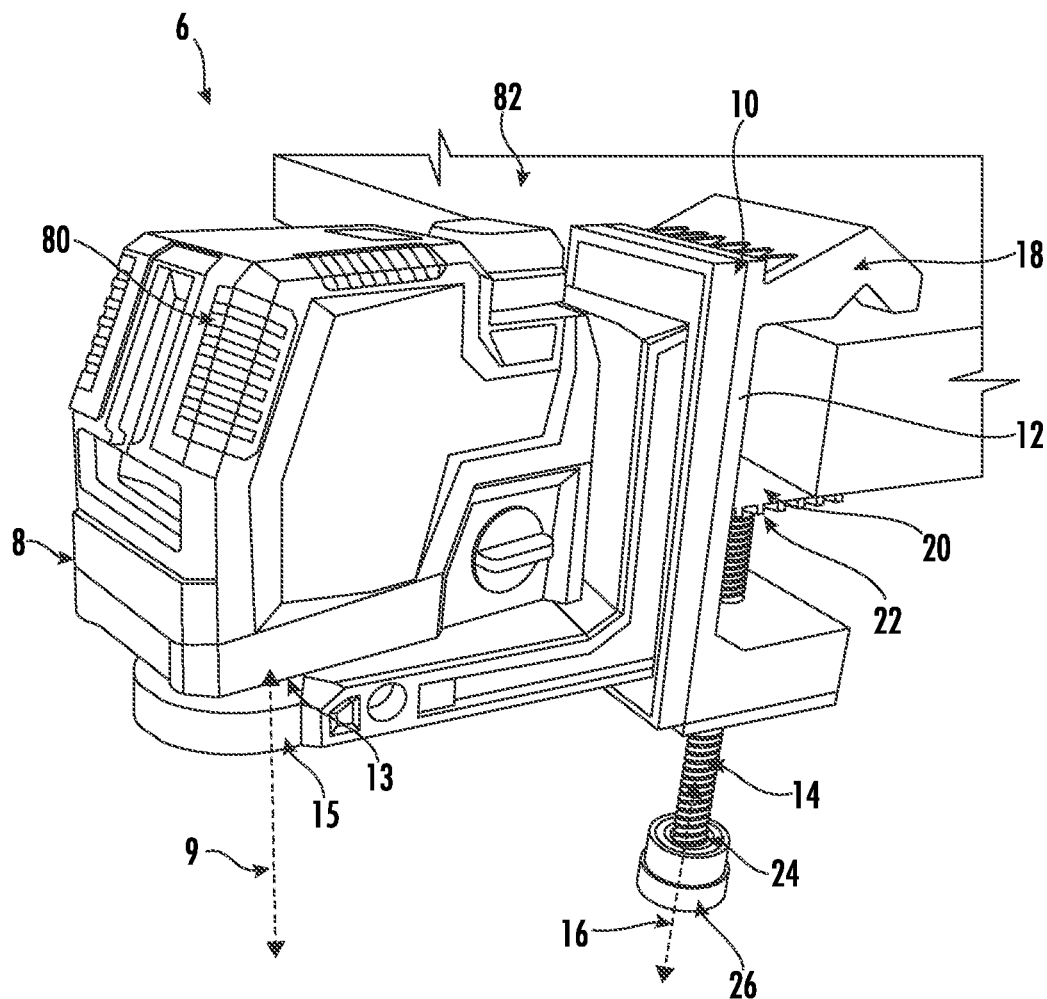
FIG. 1 is a perspective view of a clamp coupled to a tool and a work piece, according to an exemplary embodiment.
Figure 2:
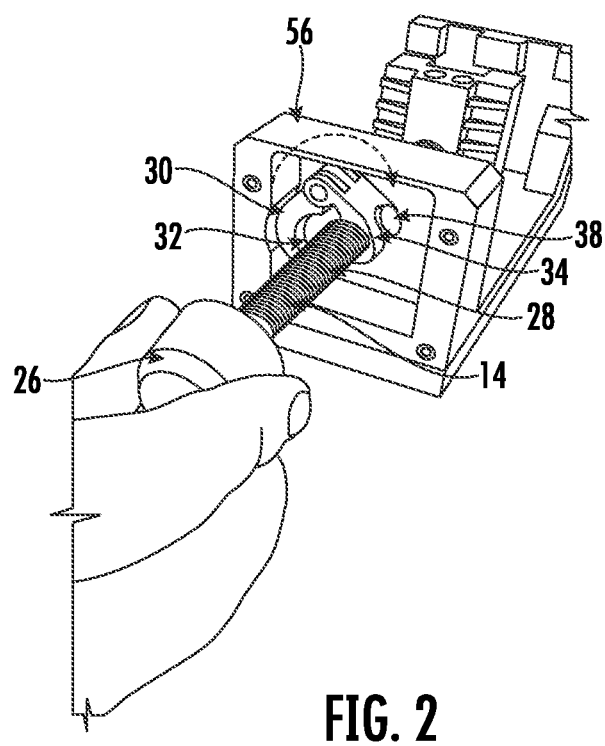
FIG. 2 is a perspective view of the clamp of FIG. 1, according to an exemplary embodiment.
Figure 3:
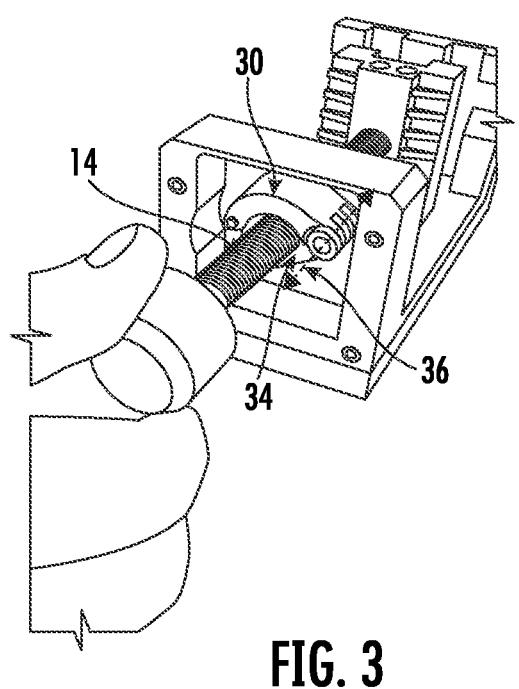
FIG. 3 is a perspective view of the clamp of FIG. 1, according to an exemplary embodiment.
Figure 4:
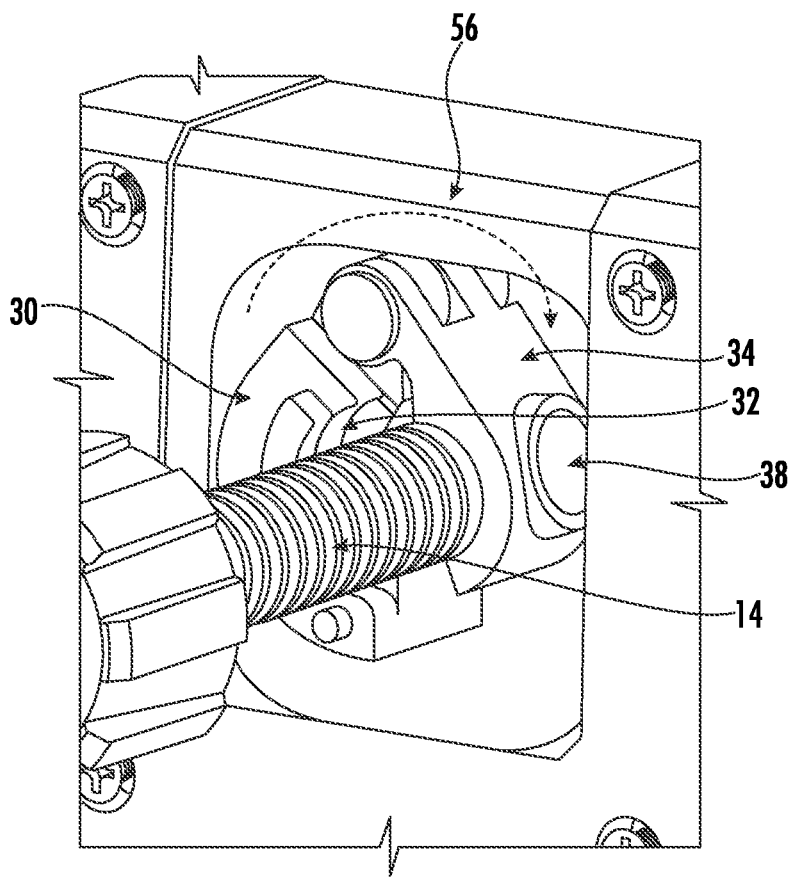
FIG. 4 is a ghost perspective view of the clamp of FIG. 1, according to an exemplary embodiment.
Figure 5:
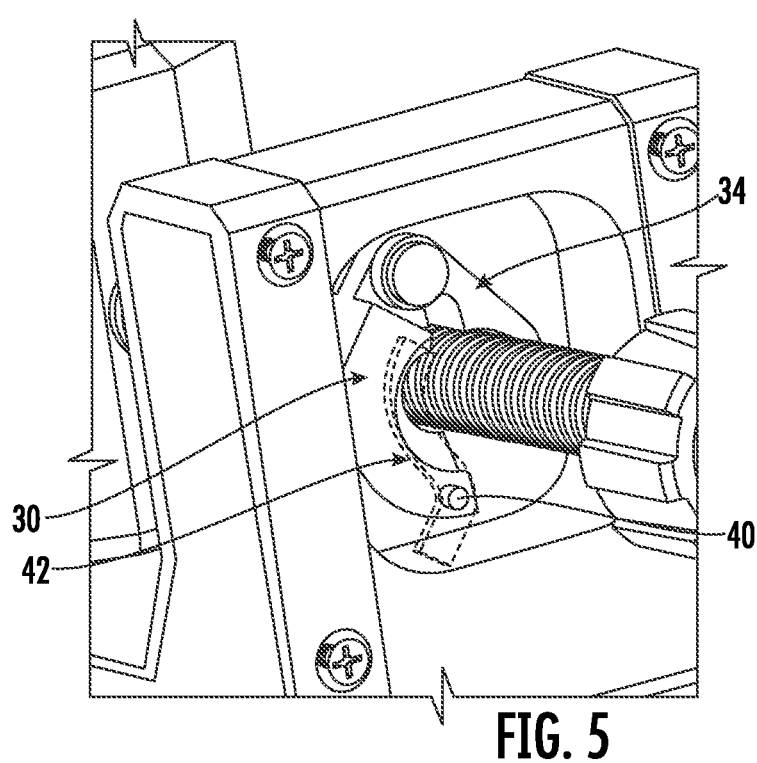
FIG. 5 is a ghost perspective view of the clamp of FIG. 1, according to an exemplary embodiment.

Referring to FIGS. 1-3, a laser level system 6 is shown according to an exemplary embodiment. The laser level system 6 includes a securing device, shown as clamp 10, and an orientation measuring device, shown as laser level 8, configured to emit a laser at a predetermined orientation with respect to gravity. Clamp 10 includes a coupling interface 13 coupled to body 12 and that is configured to couple to laser level 8, such as via being configured to rotatably couple to a laser level 8 such that the laser level 8 rotates with respect to the coupling interface 13 about a first axis 9. Clamp 10 includes body 12, shaft 14, a first jaw, shown as fixed jaw 18, and moveable jaw 20. In various embodiments fixed jaw 18 extends from body 12. Shaft 14 is slidably coupled to body 12 and extends along axis 16. Shaft 14 slides with respect to body 12 along axis 16. Coupling platform 15 is configured to couple to laser level 8. In various embodiments, laser level 8 is coupled to coupling platform 15 and laser level 8 is configured to rotate with respect to body 12 about axis 9 perpendicular to axis 16. In various embodiments, and coupling platform 15 extends from body 12 in a direction perpendicular to axis 16. Inner end 22 of shaft 14 is coupled to moveable jaw 20, and outer end 24 of shaft 14 is coupled to handle 26. In various embodiments, movable jaw 20 is configured to slide along the axis 16 closer to and further from the fixed jaw 18. In use, clamp 10 can be used to secure tools, equipment, and/or objects, shown as laser level 80, to a work piece, shown as table 82.

Locking component 30 is pivotally coupled to securing component 34 and pivots around axis 36 with respect to securing component 34. Locking component 30 is configured to interface with the shaft 14. Locking component 30 is configured to actuate between a locked position and an unlocked position. When the locking component 30 is in the locked position the locking component 30 interfaces with the shaft 14 to bias the shaft 14 to remain stationary with respect to the body 12, and when the locking component 30 is in the unlocked position the locking component 30 does not interface with the shaft 14. Securing component 34 is pivotally coupled to locking component 30 such that securing component 34 pivots with respect to locking component 30 around axis 36. Stated another way, locking component 30 around axis 36 with respect to securing component 34. In various embodiments axis 36 is parallel to axis 16. Securing component 34 is configured to acuate circumferentially around the shaft 14. A biasing element, shown as magnet 38, biases securing component 34 towards shaft 14 (e.g., because shaft 14 is formed from a ferrous metal). In a specific embodiment, securing component 34 interfaces against outer surface 28 of shaft 14. In other embodiments, the biasing element is a spring that biases securing component 34 towards shaft 14. Magnet 38 maintains securing component 34 against the shaft 14 so that locking component 30 interfaces against shaft 14 independent of the orientation of clamp 10.

In use, a user manipulates handle 26 to rotate shaft 14 to actuate locking component 30 between an unlocked position (FIG. 2) and a locked position (FIG. 3). To move locking component 30 into the locked position, a user rotates handle 26 in clockwise direction 56. In a specific embodiment, friction between securing component 34 and shaft 14 exerts a force against securing component 34 to also rotate in clockwise direction 56. Because locking component 30 and securing component 34 are pivotally coupled, securing component 34 rotating in clockwise direction 56 pulls locking component 30 to also rotate in clockwise direction 56. As will be explained below, locking component 30 rotating in clockwise direction 56 engages locking component 30 against shaft 14 so that inner surface 32 of locking component 30 interfaces against outer surface 28 of shaft 14.

In a specific embodiment, outer surface 28 of shaft 14 and inner surface 32 of locking component 30 each include a threaded configuration that interface against each other. In a specific embodiment, the threaded configuration of each of outer surface 28 of shaft 14 and inner surface 32 of locking component 30 is helical, in which case shaft 24 has a helical threaded outer surface 28 and locking component 30 has a helical threaded inner surface 32. For example, in various embodiments shaft 14 comprises a helical thread that interfaces against the inner surface 58 of the securing component 34. In various embodiments the inner surface 58 of securing component 34 comprises a flat surface, such as a curved or planar surface without protrusions or threads, that interfaces against shaft 14. In various embodiments, securing component 34 is configured to actuate circumferentially in a first direction 56 when the locking component 30 is transitioning from the locked position to the unlocked position, and the securing component 34 is configured to actuate circumferentially in a second direction opposite the first direction 56 when the locking component 30 is transitioning from the unlocked position to the locked position.

Referring to FIG. 4-7, various aspects of clamp 10 are shown. Body 12 of clamp 10 includes a groove or recess 42. Protrusion 40 extends from locking component 30 and extends within recess 42. In various embodiments locking component 30 includes protrusion 40.

In a specific embodiment, recess 42 includes an S-shape. As locking component 30 rotates in clockwise direction 56, the interface between protrusion 40 and the shape of recess 42 pivot locking component 30 towards shaft 14 until locking component 30 and shaft 14 are interfacing. When locking component 30 is rotated in a counter-clockwise direction opposite direction 56, locking component 30 pivots away shaft 14 until locking component 30 and shaft 14 are not interfacing.

In a specific embodiment, when locking component 30 is in the locked position, locking component 30 interfaces with shaft 14 thereby biasing shaft 14 to not slide with respect to body 12. In a specific embodiment, when locking component 30 is in the unlocked position, locking component 30 does not interface with shaft 14.

Figure 6:
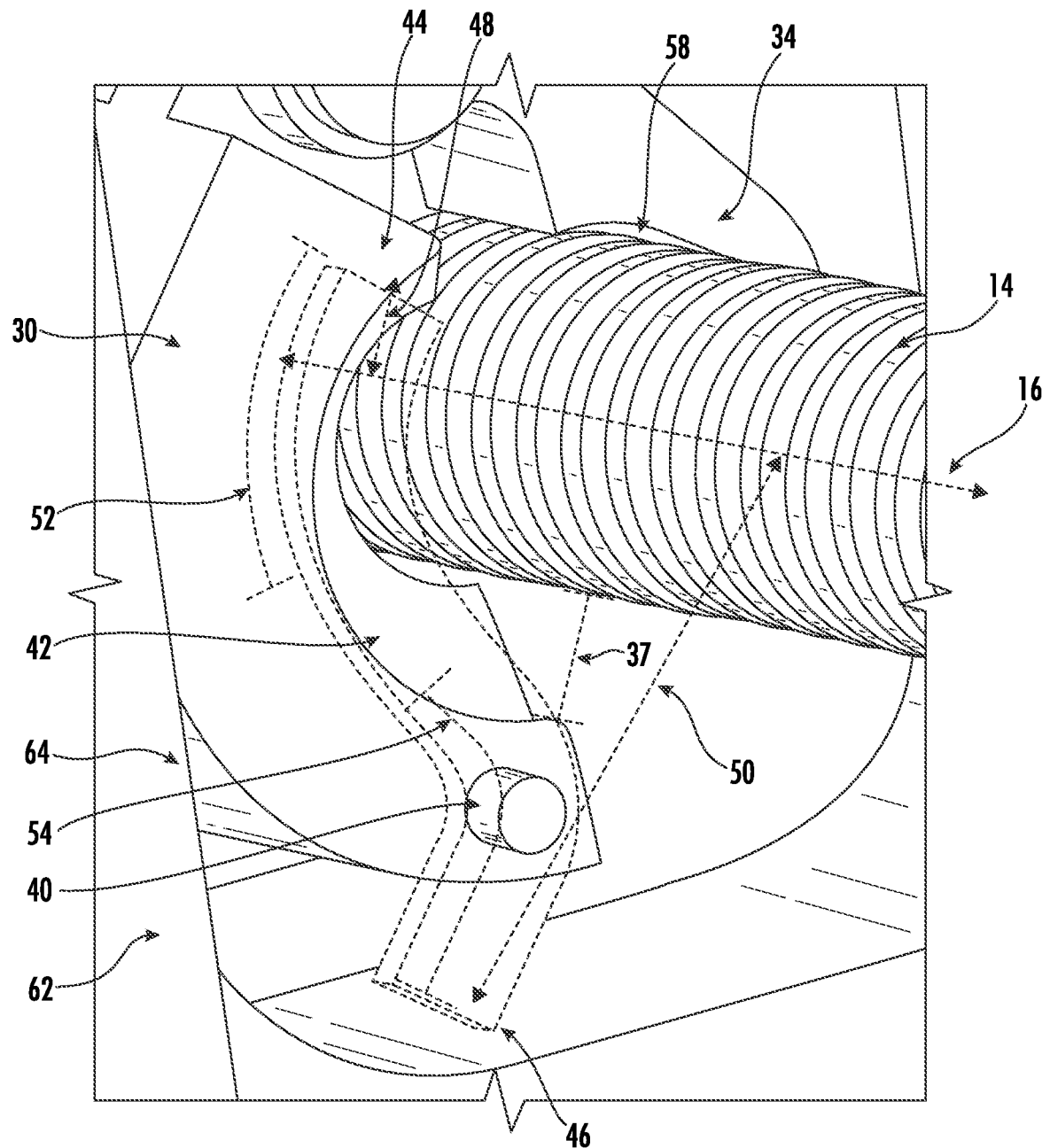
FIG. 6 is a detailed ghost perspective view of the clamp of FIG. 1, according to an exemplary embodiment.
Figure 7:
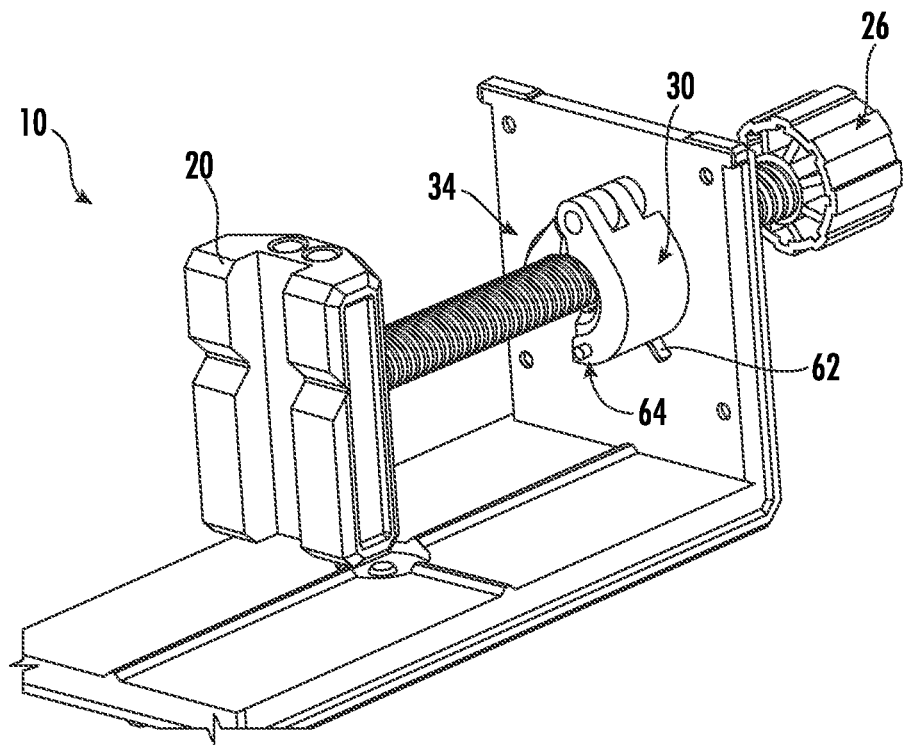
FIG. 7 is a perspective view of various components of the clamp of FIG. 1, according to an exemplary embodiment.

Turning to FIG. 6, recess 42 includes a first end 44 and an opposing second end 46. First end 44 is a first distance 48 from axis 16 of shaft 14, and second end 46 is second distance 50 from axis 16 greater than first distance 48. When protrusion 40 is located at and/or near first end 44 of recess 42, locking component 30 is in the locked position. When protrusion 40 is located at and/or near second end 46 of recess 42, locking component 30 is in the unlocked position. Locking component 30 extends distance 37 from shaft 14. Distance 37 between locking component 30 and shaft 14 varies as locking component 30 actuates between the locked position, when distance 37 is zero in various embodiments, and when locking component 30 is in the unlocked position, when distance 37 is greater than zero in various embodiments.

Similarly, when protrusion 40 is within first portion 52 of recess 42, locking component 30 is in the locked position. When protrusion 40 is within second portion 54 of recess 42, locking component 30 is in the unlocked position. In various embodiments, the engagement between protrusion 40 and recess 42 provides for precise movement between locked and unlocked positions and acts to stabilize locking component 30 within the housing during operation of the clamping mechanism.

In various embodiments securing component 34 includes an inner surface 58 that interfaces against shaft 14. In a specific embodiment, inner surface 58 of securing component 34 is a flat surface. As a result, shaft 14 can slide along axis 16 with respect to body 12 if sufficient force is exerted on shaft 14 to overcome friction between securing component 34 and shaft 14.

In a specific embodiment, locking component 30 includes projection 64. In a specific embodiment projection 64 is axially aligned with and extending away from protrusion 40. The interface between projection 64 and recess 62 is similar to the interface between protrusion 40 and recess 42.

Figure 8:
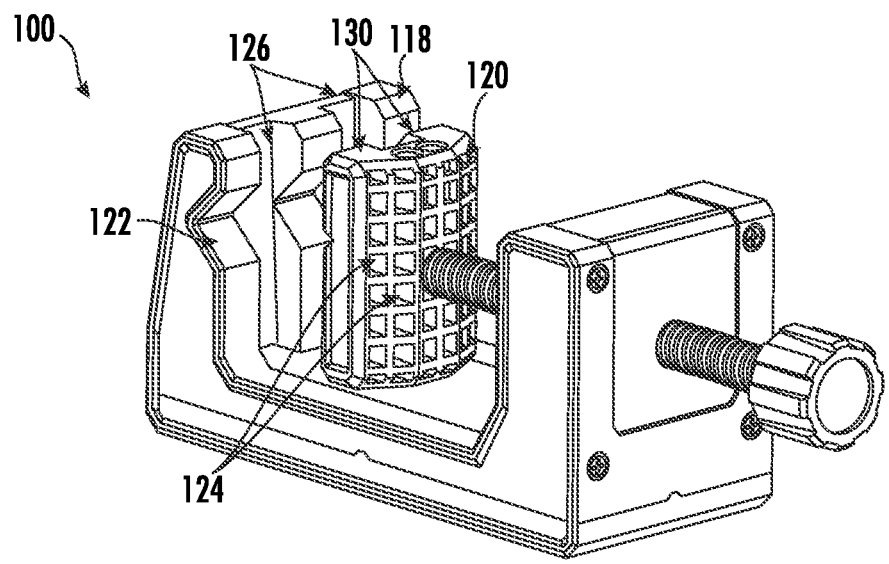
FIG. 8 is a perspective view of a clamp, according to an exemplary embodiment.

FIG. 8 shows a clamp 100 according to an exemplary embodiment. Clamp 100 is substantially the same as clamp 10 except for the differences discussed herein. Clamp 100 has a fixed jaw 118 and moveable jaw 120. Fixed jaw 118 has an outer surface 122 that is angled inward toward moveable jaw 120. Moveable jaw 120 includes a rear surface with a plurality of open cells 124. Fixed jaw 118 includes two recesses, shown as channels 126, that are shaped and positioned to receive projections 130 of moveable jaw 120. In various embodiments, one of the fixed jaw 118 and the movable jaw 120 includes a recess, shown as channel 126, and the other of the fixed jaw 118 and the movable jaw 120 includes a projection 130 received within the recess, shown as channel 126.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

What is claimed is:

1. A laser level system including:
   a laser level configured to emit a laser at a predetermined orientation with respect to gravity; and
   a clamp comprising:
   a coupling interface configured to couple to the laser level;
   a body coupled to the coupling interface;
   a shaft extending along a first axis, the shaft slidably coupled to the body and configured to slide along the first axis with respect to the body;
   a fixed jaw extending from the body;
   a movable jaw coupled to an end of the shaft, the movable jaw configured to slide along the first axis closer to and further from the fixed jaw;
   a locking component configured to interface with the shaft, the locking component configured to actuate between a locked position and an unlocked position, wherein when the locking component is in the locked position the locking component interfaces with the shaft to bias the shaft to remain stationary with respect to the body, and wherein when the locking component is in the unlocked position the locking component does not interface with the shaft;
   a securing component pivotally coupled to the locking component, wherein the securing component is configured to actuate circumferentially around the shaft; and
   a biasing element that biases the securing component towards the shaft;
   wherein, when the shaft moves along the first axis in a first direction, the shaft actuates the locking component into the locked position and, when the shaft moves along the first axis in a second direction, the shaft actuates the locking component into the unlocked position.

2. The laser level system of claim 1, the locking component pivots with respect to the securing component about a second axis parallel to the first axis.

3. The laser level system of claim 1, wherein the biasing element comprises a magnet.

4. The laser level system of claim 1, the securing component comprises an inner surface that interfaces against the shaft.

5. The laser level system of claim 4, the shaft comprises a helical thread that interfaces against the inner surface of the securing component.

6. The laser level system of claim 5, the inner surface of the securing component comprises a flat surface.

7. The laser level system of claim 1, the shaft comprises a threaded outer surface and the locking component comprises a threaded inner surface that interfaces with the threaded outer surface of the shaft.

8. The laser level system of claim 7, wherein the threaded outer surface of the shaft and the threaded inner surface of the locking component are each helical.

9. The laser level system of claim 1, wherein one of the fixed jaw and the movable jaw comprises a recess, and wherein the other of the fixed jaw and the movable jaw comprises a projection received within the recess.

10. The laser level system of claim 1, wherein the laser level rotates with respect to the body about a second axis perpendicular to the first axis.

11. The laser level system of claim 10, the coupling interface comprising a platform that extends away from the shaft perpendicular to the first axis, wherein the platform is configured to couple to the laser level.

12. A clamp comprising:
   a body comprising a recess comprising a first end and a second end;
   a shaft extending along a first axis, the shaft configured to slide along the first axis with respect to the body;
   a coupling interface coupled to the body, the coupling interface comprising a platform that extends away from the shaft perpendicular to the first axis, the platform configured to couple to a laser level;
   a fixed jaw extending from the body;
   a movable jaw coupled to an end of the shaft, the movable jaw configured to slide along the first axis closer to and further from the fixed jaw; and
   a locking component configured to interface with the shaft, the locking component configured to actuate between a locked position and an unlocked position, wherein when the locking component is in the locked position the locking component interfaces with the shaft to bias the shaft to remain stationary with respect to the body, and wherein when the locking component is in the unlocked position the locking component does not interface with the shaft, the locking component comprising a projection that extends within the recess, the projection is movable along the recess between the first end and the second end such that when the projection is moved towards the first end of the recess the locking component is actuated to the locked position, and when the projection moved towards the second end of the recess the locking component is actuated to the unlocked position.

13. The clamp of claim 12, further comprising:
a securing component coupled to the locking component, the securing component interfacing against the shaft; and
a biasing element that biases the securing component towards the shaft.

14. The clamp of claim 13, wherein the securing component is configured to actuate circumferentially around the shaft.

15. The clamp of claim 13, the locking component pivots with respect to the securing component about a second axis parallel to the first axis.

16. The clamp of claim 12, wherein the laser level rotates with respect to the body about a second axis perpendicular to the first axis.

17. A clamp comprising:
a coupling interface configured to rotatably couple to a laser level such that the laser level rotates with respect to the coupling interface about a first axis;
a body coupled to the coupling interface;
a shaft extending along a second axis, the shaft slidably coupled to the body and configured to slide along the second axis with respect to the body;
a fixed jaw coupled to the body;
a movable jaw coupled to the shaft;
a locking component configured to interface with the shaft, the locking component configured to actuate between a locked position and an unlocked position, wherein when the locking component is in the locked position the locking component interfaces with the shaft to bias the shaft to remain stationary with respect to the body; and
a securing component pivotally coupled to the locking component, wherein the securing component is configured to actuate circumferentially in a first direction when the locking component is transitioning from the locked position to the unlocked position, and wherein the securing component is configured to actuate circumferentially in a second direction opposite the first direction when the locking component is transitioning from the unlocked position to the locked position;
wherein, when the shaft moves along the second axis, the shaft actuates the locking component between the locked position and the unlocked position.

18. The clamp of claim 17, the locking component pivots with respect to the securing component about a third axis parallel to the second axis that the shaft extends along.

19. The clamp of claim 17, the shaft comprises a helical threaded outer surface and the locking component comprises a helical threaded inner surface that interfaces with the helical threaded outer surface of the shaft.

20. The clamp of claim 17, further comprising a magnet that biases the securing component towards the shaft.

* * * * *